United States Patent
Glorion et al.

(10) Patent No.: US 6,246,980 B1
(45) Date of Patent: Jun. 12, 2001

(54) METHOD OF SPEECH RECOGNITION

(75) Inventors: Catherine Glorion, Saint Cyr L'Ecole; Laurent Lelievre, Jouars-Pontchartrain; Philip Lockwood, Vaureal, all of (FR)

(73) Assignee: Matra Nortel Communications (FR)

( * ) Notice: Subject to any disclaimer, the term of this patent is extended or adjusted under 35 U.S.C. 154(b) by 0 days.

(21) Appl. No.: 09/161,588

(22) Filed: Sep. 28, 1998

(30) Foreign Application Priority Data

Sep. 29, 1997 (FR) .................................................. 97 12087

(51) Int. Cl.$^7$ .................................................. G10L 15/00
(52) U.S. Cl. .................................................. 704/231
(58) Field of Search ................................. 704/231, 236, 704/239, 255, 256

(56) References Cited

U.S. PATENT DOCUMENTS

| | | | | |
|---|---|---|---|---|
| 4,718,094 | * | 1/1988 | Bahl et al. | 704/231 |
| 4,783,803 | | 11/1988 | Baker et al. | |
| 4,783,804 | * | 11/1988 | Juang et al. | 704/256 |
| 4,881,266 | * | 11/1989 | Nitta et al. | 704/243 |
| 4,972,485 | * | 11/1990 | Dautrich et al. | 704/251 |
| 5,003,603 | | 3/1991 | Searcy et al. | |
| 5,241,619 | * | 8/1993 | Schwartz et al. | 704/201 |
| 5,515,475 | * | 5/1996 | Gupta et al. | 704/242 |
| 5,655,058 | * | 8/1997 | Balasubramanian et al. | 704/256 |
| 5,737,723 | * | 4/1998 | Riley et al. | 704/243 |
| 5,799,276 | * | 8/1998 | Komissarchik et al. | 704/254 |
| 5,845,235 | * | 12/1998 | Gupta et al. | 704/231 |
| 5,970,239 | * | 10/1999 | Bahl et al. | 704/231 |

FOREIGN PATENT DOCUMENTS

| | | |
|---|---|---|
| 0 135 046 | 3/1985 | (EP) . |
| 0 200 347 | 11/1986 | (EP) . |
| 0 241 183 | 10/1987 | (EP) . |
| 0 573 301 | 12/1993 | (EP) . |
| 651 372 | 5/1995 | (EP) . |

OTHER PUBLICATIONS

B. Mazor et al., "The Design of Speech–Interactive Dialogs For Transaction–Automation Systems", Speech Communication, Nov. 1995, vol. 17, No. 3/04, pp. 313–320.

"Methods For Constructing Alternate Word Lists", IBM Technical Disclosure Bulletin, May 1992, vol. 34, No. 12, pp. 355–356.

S. A. Dudani, "The Distance–Weighted κ–Nearest–Neighbor Rule", IEEE Transactions on Systems, Man, and Cybernetics, Apr. 1976, pp. 325–327.

T. Bayley, et al., "A Note on Distance–Weighted κ–Nearest Neighbor Rules", IEEE Transactions on Systems. Man and Cybernetics, Apr. 1978, vol.–SMC–8, No. 4, pp. 311–313.

* cited by examiner

*Primary Examiner*—Fan Tsang
*Assistant Examiner*—Michael N. Opsasnick
(74) *Attorney, Agent, or Firm*—Kilpatrick Stockton LLP

(57) ABSTRACT

A recognition test is applied to a segment of speech produced by a speaker. An examination is carried out to see whether a first optimum model, with which the recognition test has matched the spoken segment of speech, satisfies a criterion of likelihood. If the criterion of likelihood is satisfied, this first optimum model is selected. If not, a repetition of the speech segment is requested. The recognition test is applied to the segment of speech repeated by the speaker. This second optimum model is selected if it satisfies the likelihood criterion. If not, and if a combination of the results of the two recognition tests satisfies at least one criterion of combined selection, one of the models which the two recognition tests have matched with the spoken segment of speech and with the repeated segment is selected.

4 Claims, 2 Drawing Sheets

METHOD OF SPEECH RECOGNITION

BACKGROUND OF THE INVENTION

The present invention concerns the field of automatic speech recognition.

A system of speech recognition includes two main functional units: a parametrization unit and a recognition unit. To these there is often added a learning unit serving to construct the dictionary of references used by the recognition unit.

The parametrization unit calculates relevant parameters on the basis of speech signals picked up by a microphone. These calculations are carried out according to a parametric representation chosen in order to differentiate vocal forms in the best possible way, separating the semantic information contained in the speech from the aesthetic information peculiar to diction. Cepstral representations constitute an important class of such representations (see EP-A-0 621 582).

The recognition unit makes the association between an observed segment of speech, represented by the parameters calculated by the parametrization unit, and a reference for which another set of parameters is stored in a dictionary of references. The sets of parameters stored in the dictionary in association with the different references can define deterministic models (they are for example composed directly of vectors coming from the parametrization unit). But most often, in order to take into account the variability of speech production and of the acoustic environment, sets of parameters which characterise stochastic models are rather used. Hidden Markov models (HMM) constitute an important class of such models. These stochastic models make it possible, by searching out the maximum likelihood, to identify the model which takes into account in the best way the observed sequence of parameters, and to select the reference associated with this model (see L. R. RABINER: "A Tutorial on Hidden Markov Models and Selected Applications in Speech Recognition"; Proceedings of the IEEE, Vol. 77, No. 2, February 1989, pages 257–285).

In general, the recognition of a word or a speech segment is not limited to searching for the maximum likelihood. One or more other likelihood criteria are examined to determine if the optimum model, presenting the maximum likelihood, should in fact be selected. This criterion is for example that the maximised likelihood exceeds a certain threshold. If the criterion is verified, the optimum model is selected and the recognition unit provides a result.

Otherwise, several solutions can be used: a first solution is to ask the speaker to provide confirmation that the speech segment uttered corresponds to the reference associated with the optimum model, or to one of the references associated with the n models for which the likelihoods are greatest (see EP-A-0 651 372). The user then has to carry out special manipulations in order to validate his choice, which is not ergonomic, especially for applications in hands-free mode.

Another solution is to ask the speaker to repeat what he has just said. If the criterion of likelihood is verified by the optimum model proposed as a result of the recognition test carried out on this repetition, the recognition terminates. In the contrary case, another repetition is requested, etc. This second solution is not very well suited to noisy environments or environments that are disrupted by multiple speakers: the noise interrupting the first pronunciation and causing the non-verification of the likelihood criterion will often interrupt the repetition, thus causing a further non-verification of the criterion, in such a way that the user finds himself forced to repeat the same word several times without success. If an attempt is made to overcome this disadvantage by adopting a less severe criterion of likelihood, the system tends to make numerous false starts in noisy environments.

EP-A-0 573 301 describes a method in which, in order to establish the ranking on which the recognition is based, the a priori probability of pronunciation of a word associated with a reference is replaced, after the repetition by the speaker, by the conditional probability of pronunciation of this word knowing that the same word has been said twice. The conditional probability is calculated with the aid of a development in accordance with Bayes theorem. This method thus seeks to refine the absolute values of the recognition scores of different entries in the dictionary of references.

An object of the present invention is to propose an effective solution for recognising speech in ambiguous cases.

SUMMARY OF THE INVENTION

The invention proposes a method of speech recognition which implements tests of recognition, wherein each test of recognition matches a segment of speech provided to the system with at least one set of parameters memorised in a dictionary of references. The method comprises the steps of:

applying the recognition test to a segment of speech uttered by a speaker;

examining whether a first optimum set of parameters, with which the recognition test has matched the spoken segment of speech, satisfies a criterion of likelihood;

if the criterion of likelihood is satisfied by the first optimum set of parameters, selecting the first optimum set of parameters;

if the criterion of likelihood is not satisfied by the first optimum set of parameters, requesting the speaker to repeat the speech segment;

applying the recognition test to the segment of speech repeated by the speaker;

examining whether a second optimum set of parameters, with which the recognition test has matched the repeated segment of speech, satisfies the criterion of likelihood;

if the criterion of likelihood is satisfied by the second optimum set of parameters, selecting the second optimum set of parameters;

if the criterion of likelihood is not satisfied by the second optimum set of parameters and if a combination of the results of the two recognition tests satisfies at least one criterion of combined selection, selecting one of the sets of parameters which the two recognition tests have matched with the spoken segment of speech and with the repeated segment of speech.

Although the criteria of likelihood, applied separately to two observations of the same word or the same speech segment, may be insufficient for the recognition to be conclusive, it will often be possible to make an adequate decision by combining these two observations and by examining other criteria in relation to the combination. The invention takes advantage of this to improve the rates of recognition for a given probability of a false start, or to reduce the probability of a false start for a given rate of recognition.

In a typical embodiment, each recognition test provides a list of $n \geq 1$ sets of parameters of the dictionary, which present the greatest likelihoods taking into account the observation of the speech segment submitted to the test, this list being arranged in order according to decreasing likelihood. Each of said first and second optimum sets of parameters is then a head of list.

The criteria of combined selection which may be used can include:

the identity of the first and second optimum sets of parameters, when the dictionary contains at least one set of rejection parameters, with n≧2, the fact that a same set of parameters, other than a set of rejection parameters, appears on the one hand at the top of the list provided by one of the two recognition tests, and on the other hand in the second position, after a set of rejection parameters, in the list provided by the other of the two recognition tests.

In applying criteria of this sort, advantage is taken of the fact that the rankings provided by the individual recognition tests are relatively reliable. The above criteria are based on these rankings rather than on the absolute values of the scores, the refinement of which, with the aid of Bayes theorem or some other weighting formula, does not necessarily provide more frequent recognition, particularly in noisy environments.

DESCRIPTION OF PREFERRED EMBODIMENTS

Figure 1:
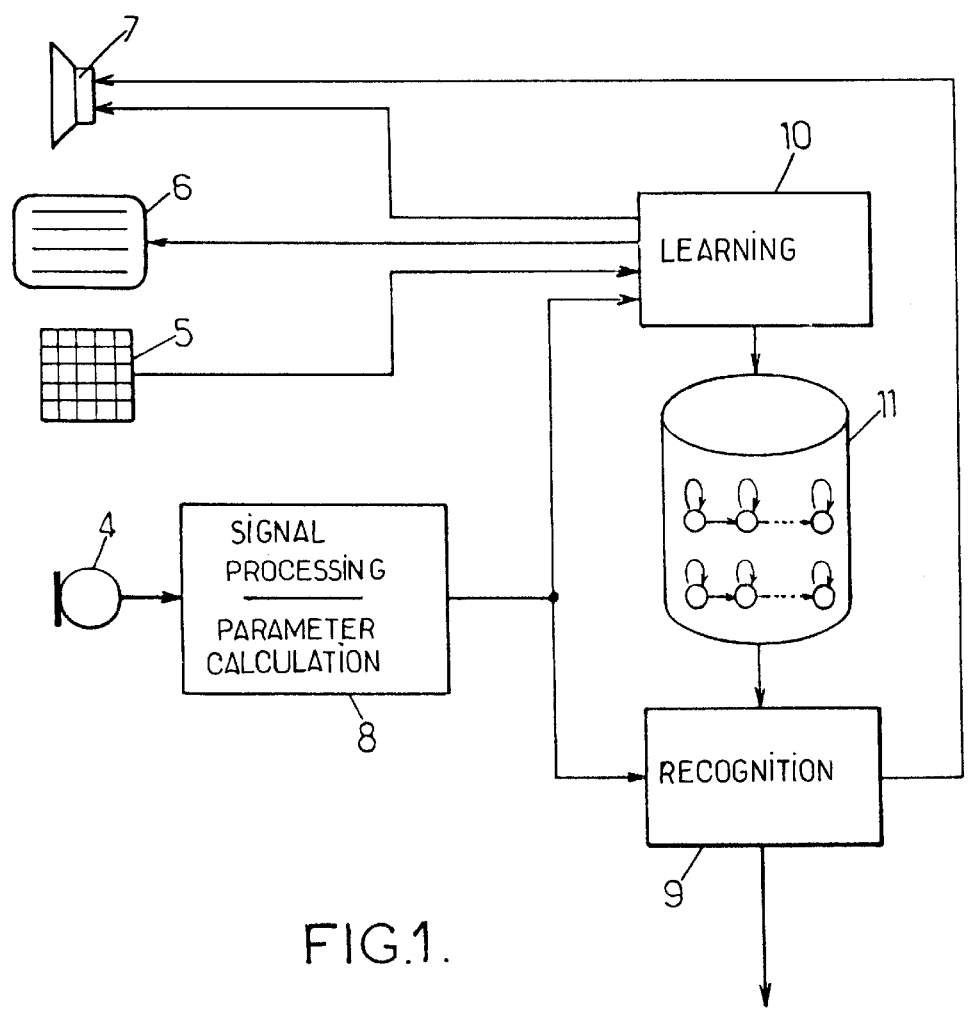
FIG. 1 is a block diagram of a recognition system implementing the present invention.

The system of speech recognition represented on FIG. 1 has a user interface consisting of a microphone 4, a keyboard 5, a display screen 6 and a loudspeaker 7.

The acoustic signals delivered by the microphone 4 are supplied to a unit 8 for signal processing which provides the relevant parameters to the recognition unit 9 and to the learning unit 10.

The keyboard 5, the screen 6 and the loudspeaker 7 serve particularly in the dialogue between the user and the recognition 9 and learning 10 units.

The recognition system comprises in addition a memory 11 which constitutes a dictionary of references. In this dictionary, the learning unit 10 records models in association with references. In the recognition phase, unit 9 analyses the parameters provided by unit 8 and matches a model with them, i.e. a set of parameters memorised in the dictionary 11, and delivers the associated reference as the output of the recognition system. This reference can then be used by the equipment of which the recognition system forms a part.

By way of illustrative example, this equipment can be a telephone terminal of the hands-free type in which the recognition system is used to control functions such as automatic dialling, in response to the names of callees and/or to control words spoken by the user. The microphone 4, the keyboard 5, the screen 6, and the loudspeaker 7 can be those which the telephone terminal comprises anyhow.

Various types of parameters representing the vocal structures, calculated by unit 8, can be used within the framework of the present invention. By way of example, they can be root-cepstral coefficients. For detailed explanations of this type of representation, reference is made to the European patent application 0 621 582. The signal processing unit 8 can thus carry out the following operations:

digitization of the signal provided by the microphone 4;

division of the digital signal into successive frames, lasting 16 ms for example;

detection of vocal activity in order to distinguish the speech frames from the signal frames which only consist of noise;

Fourier transform of each speech frame in order to obtain a spectrum $X(\omega)$, which may subjected to noise removal by spectral subtraction of estimates of noise (see EP-A-0 534 837);

application of a root compression function (or of a power function) in order to calculate the $|X(\omega)|\gamma$, where $\gamma$ represents a fixed or adaptive exponent, in the range from 0 to 2 (it is also possible to use a logarithmic compression function);

inverse Fourier transformation of the quantities $|X(\omega)|\gamma$ to obtain so-called "cepstral" coefficients, forming a vector of p coefficients (for example p≈20). This cepstral vector is provided by unit 8 with respect to the frame in question.

Each sequence of consecutive frames detected as supporting a vocal activity normally corresponds to a speech segment uttered by a speaker. For each of these segments, unit 8 delivers a sequence of cepstral vectors which can be processed by units 9 and 10.

In the embodiment described here, each reference in the dictionary 11 is associated with a hidden Markov model characterised by a number of states and, for each state, by a law of density of probability of observation of the cepstral vectors. These laws are for example Gaussian laws of dimension p. They are thus defined each by a mean (vector) and by a variance (matrix).

The learning phase consists in calculating the parameters of the laws of probability associated with the hidden Markov models. For each reference to be memorised, the user is invited to speak several times the associated word in order to provide the unit 10 with observation statistics which are sufficient to enable it to evaluate in a reliable fashion the parameters of the laws of probability relative to the different states of the model.

The methods used to proceed to these estimates are standard. In this regard reference may be had to the article by L. R. RABINER quoted previously.

It will moreover be noted that the method of recognition according to the invention may be applied to systems which are not learning systems.

Certain of the models contained in the dictionary 11 are rejection models artificially constructed to be preferentially retained by unit 9 when the speech segment submitted to the recognition test does not correspond to any of the words referenced in the dictionary.

A recognition test carried out by unit 9, on the basis of a sequence of cepstral vectors obtained from a segment of speech processed by unit 8, consists in identifying which of the models of the reference dictionary 11 maximises the likelihood of the observation of said sequence of cepstral vectors. A standard means of carrying out this identification is to use the Viterbi algorithm. For different models of the dictionary, a Viterbi trellis makes it possible to determine the sequence of state which maximises the probability of observation of the sequence of cepstral vectors. The optimum model, for which the maximised probability is the greatest, is identified as well as possibly some other models for which the maximised probability is relatively significant. Here the case is considered where the recognition test provides, for each speech, a list of n models ranked in the order of decreasing likelihood (n≧1). The test thus provides an optimum model (top of the list) and n−1 other likely models.

Figure 4:
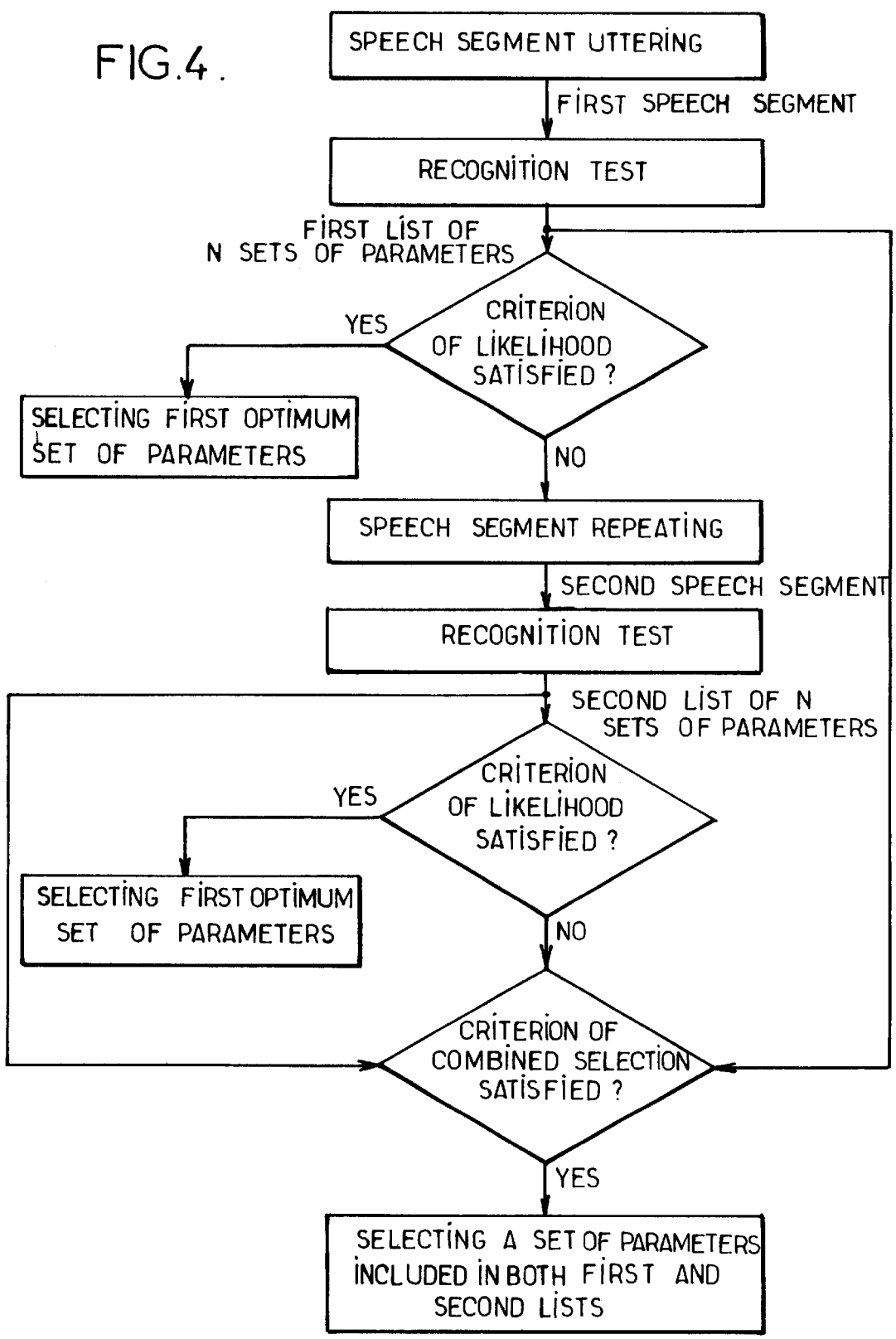
FIG. 4 is a flow diagram showing the main steps of the method of speech recognition according to the present invention.

The method of speech recognition according to the present invention comprises the steps which are given below and are illustrated in FIG. 4.

The recognition test is completed by an examination of a likelihood criterion to decide if the model which appears at the top of the list should be recognised as corresponding to what the speaker has said, or not. In the affirmative, the reference associated with this model is produced as the output of the recognition unit 9.

Various types of likelihood criteria can be used. It can be for example the fact that the maximised probability $p_{max}$ for the optimum model exceeds a predetermined threshold S. This threshold can be absolute; it is necessary then to have $p_{max}>S$. It can also be expressed relative to the probability $p'_{max}$ maximised for the model appearing in the second position in the list; then it is necessary to have $p_{max}>S\times p'_{max}$. The likelihood criterion may further combine several thresholding sub-criteria.

If the likelihood criterion is not verified, the recognition test carried out on the pronunciation of the speech segment is not sufficient for the unit 9 to make its decision.

In this case unit 9 requires the user to repeat the word spoken previously, for example by controlling the display of a message on the screen 6 and/or the emission of a sound signal from the loudspeaker 7. Once the user has complied with this invitation, a new recognition test is carried out.

If the new recognition test is conclusive (the likelihood criterion is verified), the optimum model provided by this new recognition test is selected and the associated reference is delivered by unit 9.

If the likelihood criterion is not verified any more by the optimum model provided by the new test of recognition, it is nevertheless possible for unit 9 to select a model and deliver the corresponding reference, after having combined the results of the recognition tests carried out on the first pronunciation of the word and on the repetition of same, and examined one or more other selection criterion relating to this combination.

Figure 2:
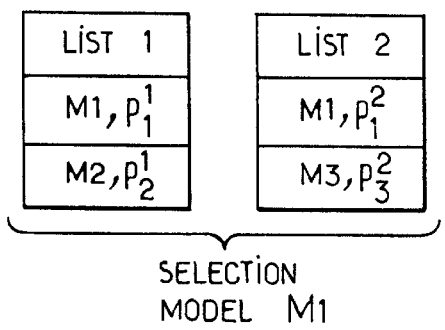
FIGS. 2 and 3 are diagrams illustrating the criteria for combined selection which can be examined in the system of FIG. 1.
Figure 3:
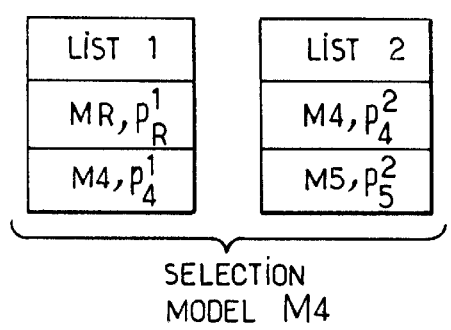

Simple examples of such criteria of combined selection are illustrated by FIGS. 2 and 3 in the particular case where n=2. On these figures, the notations Mi, $p_i^j$ refer to a model No. i for which a likelihood $p_i^j$ has been calculated further to the j-th pronunciation of the word (j=1,2).

A first criterion illustrated by FIG. 2, is the identity of the optimum models provided by the two recognition tests: if the same model M1 appears at the top of the lists provided by the recognition tests applied to the first pronunciation of the word and to the repetition of same, but without verifying on either occasion the criterion of likelihood ($p_1^1<S$ and $p_1^2<S$, or $p_1^1<S\times p_2^1$ and $p_1^2<S\times p_3^2$), it will be possible nevertheless for this model to be selected by the recognition unit 9. Indeed, it is very unlikely that the same model will appear twice in succession as optimum without the corresponding word having been spoken.

A variant of this first criterion would be, when the same model M1 appears at the head of the two lists without verifying on either occasion the likelihood criterion, to select this model only if one and/or the other of the calculated probabilities $p_1^1$ and $p_1^2$ verify another, less restrictive condition.

A second criterion of combined selection, illustrated by FIG. 3, is the fact that the same word model M4 figures on the one hand at the head of the list provided by one of the two recognition tests, without verifying the criterion of likelihood ($p_4^2<S$, or $p_4^2<S\times p_5^2$), and on the other hand in second position after a rejection model MR, in the list provided by the other of the two recognition tests.

It will be appreciated that various other criteria of combined selection could be used by the recognition unit 9.

The recognition system according to the invention permits the user to repeat the word pronounced without having to carry out any special manipulation (depressing a key or anything else). The performances of the system in a noisy environment can be improved thanks to the possibilities of combined selection. It is possible to adopt, for the individual tests, criteria of likelihood which are relatively more severe in order to limit the triggering of the system by background noise. If, however, the system is triggered by extraneous noise, the user retains the possibility of pronouncing a word without having to reactivate the system by a special manipulation.

We claim:

1. Method of speech recognition applying recognition tests to speech segments uttered by a speaker, wherein each recognition test applied to a speech segment provides a list of n sets of parameters memorised in a dictionary of references, n being a number at least equal to one, whereby the sets of said list present maximum likelihoods taking into account the observation of the speech segment, said list being ranked according to decreasing likelihood, the method comprising the steps of:

applying the recognition test to a first speech segment uttered by the speaker;

examining whether a first optimum set of parameters, obtained at the top of the list of n sets provided by the recognition test applied to the first speech segment, satisfies a criterion of likelihood;

if the criterion of likelihood is satisfied by the first optimum set of parameters, selecting the first optimum set of parameters;

if the criterion of likelihood is not satisfied by the first optimum set of parameters, requesting the speaker to repeat the speech segment;

applying the recognition test to a second speech segment as repeated by the speaker;

examining whether a second optimum set of parameters, obtained at the top of the list of n sets provided by the recognition test applied to the second speech segment, satisfies the criterion of likelihood;

if the criterion of likelihood is satisfied by the second optimum set of parameters, selecting the second optimum set of parameters;

if the criterion of likelihood is not satisfied by the second optimum set of parameters and if a combination of the results of the recognition test applied to the first and second speech segments satisfies at least one criterion of combined selection, selecting a set of parameters included in both lists of n sets provided by the recognition test applied to the first and second speech segments, wherein said at least one criterion of combined selection comprises the identity of the first and second optimum sets of parameters.

2. Method of learning according to claim 1, wherein the sets of parameters memorised in the dictionary of references define hidden Markov models.

3. Method of speech recognition applying recognition tests to speech segments uttered by a speaker, wherein each recognition test applied to a speech segment provides a list of n sets of parameters memorized in a dictionary of references, n being a number at least equal to two, whereby the sets of said list present maximum likelihoods taking into account the observation of the speech segment, said list being ranked according to decreasing likelihood, wherein the dictionary of references contains at least one set of rejection parameters, the method comprising the steps of:

applying the recognition test to a first speech segment uttered by the speaker;

examining whether a first optimum set of parameters, obtained at the top of the list of n sets provided by the recognition test applied to the first speech segment, satisfies a criterion of likelihood;

if the criterion of likelihood is satisfied by the first optimum set of parameters, selecting the first optimum set of parameters;

if the criterion of likelihood is not satisfied by the first optimum set of parameters, requesting the speaker to repeat the speech segment;

applying the recognition test to a second speech segment as repeated by the speaker;

examining whether a second optimum set of parameters, obtained at the to of the list of n sets provided by the recognition test applied to the second speech segment, satisfies the criterion of likelihood;

if the criterion of likelihood is satisfied by the second optimum set of parameters, selecting the second optimum set of parameters;

if the criterion of likelihood is not satisfied by the second optimum set of parameters and if a combination of the results of the recognition test applied to the first and second speech segments satisfies at least one criterion of combined selection, selecting a set of parameters included in both lists of n sets provided by the recognition test applied to the first and second speech segments, wherein said at least one criterion of combined selection comprises both the appearance of a set of parameters, other than a set of rejection parameters, at the top of the list provided by the recognition test applied to one of the first and second speech segments, and the appearance of the same set of parameters in second position, after a set of rejection parameters, in the list provided by the recognition test applied to the other one of the first and second speech segments.

4. Method of learning according to claim 3, wherein the sets of parameters memorised in the dictionary of references define hidden Markov models.

* * * * *

UNITED STATES PATENT AND TRADEMARK OFFICE
CERTIFICATE OF CORRECTION

PATENT NO. : 6,246,980 B1  
DATED : June 12, 2001  
INVENTOR(S) : Catherine Glorion, Laurent Lelievre and Philip Lockwood Page 1 of 1

It is certified that error appears in the above-identified patent and that said Letters Patent is hereby corrected as shown below:

<u>Column 7,</u>  
Line 27, "to" should be -- top --.

Signed and Sealed this

First Day of January, 2002

Attest:

JAMES E. ROGAN  
*Attesting Officer*     *Director of the United States Patent and Trademark Office*